United States Patent [19]
Gerling et al.

[11] Patent Number: 5,608,281
[45] Date of Patent: Mar. 4, 1997

[54] INDUCTION MOTOR

[75] Inventors: Dieter Gerling; Peter Lürkens, both of Aachen, Germany

[73] Assignee: U.S. Philips Corporation, New York, N.Y.

[21] Appl. No.: 554,123

[22] Filed: Nov. 6, 1995

[30] Foreign Application Priority Data

Nov. 7, 1994 [DE] Germany ............... 44 39 690.2

[51] Int. Cl.$^6$ .................................... H02K 17/00
[52] U.S. Cl. ................ 310/268; 310/156; 310/166; 310/105; 310/62
[58] Field of Search ................. 310/268, 156, 310/105, 106, 237, 62, 63

[56] References Cited

U.S. PATENT DOCUMENTS

| 2,880,335 | 3/1959  | Dexter      | 310/211 |
| 2,956,169 | 10/1960 | Buss et al. | 310/268 |
| 3,121,814 | 2/1964  | Kober       | 310/268 |
| 3,128,401 | 4/1964  | Allen       | 310/106 |
| 4,132,910 | 1/1979  | Kiss et al. | 310/268 |
| 4,311,937 | 1/1982  | Clark       | 310/62  |
| 5,288,216 | 2/1994  | Bolte       | 417/423 |

FOREIGN PATENT DOCUMENTS

| 0487141A2 | 5/1992 | European Pat. Off. . |
| 8437719   | 5/1952 | Germany . |
| 1763113   | 7/1971 | Germany . |

OTHER PUBLICATIONS

Kubzdela et al., "Magnetodielectrics in Induction Motors with Disk Rotor," IEEE Transactions on Magnetics, vol. 24, No. 1, Jan. 1988.

Kubzdela et al, "Magnetodielectrics In Induction Motors With Disk Rotor", I.E.E.E. Transactions On Magnetics, BD. 24, Nr. 1, Jan. 1988.

Stefan Kubzdela and Bogumil Weglinski, "Magnetodielectrics in Induction Motors with Disk Rotor", IEEE Transactions on Magnetics (1988), vol. 24, Jan., No. 1, New York.

Primary Examiner—Steven L. Stephan
Assistant Examiner—Burton S. Mullins
Attorney, Agent, or Firm—Edward Blocker

[57] ABSTRACT

An axial flux induction motor has a stator and a disc-shaped rotor facing the stator with an air gap there-between. The rotor disc includes a first material of relatively high magnetic permeability and a second material of relatively high electrical conductivity, the first material being of higher specific gravity than the second material. The first material is in the form of an annular ring imbedded in or supported on one surface of the disc, opposite the surface thereof which faces the stator. The outer radius $R_1$ of the annular ring and the outer radius $R_2$ of the disc are related so that $1.2 R_1 < R_2 < 1.6 R_1$. This achieves that at high rotational speeds the two disc materials will be subjected to more nearly equal centrifugal forces thereby making it feasible to operate at higher motor speeds.

8 Claims, 5 Drawing Sheets

INDUCTION MOTOR

BACKGROUND OF THE INVENTION

1. Field of the Invention

The invention relates to an axial flux induction motor comprising a stator having poles and a rotor facing the stator, which rotor comprises a first part of a first material and second part of a second material, which first material has a relatively high permeability compared with the second material and which second material has a relatively high electrical conductivity compared with the first material, which first part is disk-shaped and has a first outer radius $R_1$, which second part is disk-shaped and has a second outer radius $R_2$ and comprises at least a portion which extends between the stator and the first part.

The invention also relates to a vacuum cleaner comprising an impeller wheel driven by such an axial induction motor.

2. Description of the Related Art

Such an induction motor is known, for example, from EP 0 487 141 A2. This known motor forms part of a fan unit for generating gas streams, particularly for vacuum cleaners, and comprises an impeller wheel which is also electromagnetically active and in conjunction with electromagnetically active parts of the motor stator generates the torque of the impeller wheel. The electromagnetically active part of the impeller wheel is a conductive disc which is arranged in a radial plane opposite the stator and bounds the radial air gap at the rotor side. The electrically conductive rotor disc is, for example, a basic disc of the impeller wheel and is made of, for example, aluminium. At its side which is remote from the air gap this electrically conductive basic rotor disc is backed with a disc of a high-permeability material, i.e. a magnetically highly conductive layer, for example of solid iron. The known motor has the disadvantage that the rotor breaks down at a certain circumferential rotation speed due to centrifugal forces.

SUMMARY OF THE INVENTION

It is an object of the invention to provide an axial flux induction motor of the type defined in the opening paragraph, which is capable of withstanding a high circumferential rotation speed.

The axial flux induction motor according to the invention is characterized in that the first outer radius $R_1$ and the second outer radius $R_2$ are chosen according to the relation:

$$1.2\ R_1 < R_2 < 1.6\ R_1.$$

It has been found that materials with a sufficiently high permeability to obtain a good induction motor, for example iron, are less resistant to centrifugal force at high circumferential rotation speeds than materials with a sufficiently high electrical conductivity to obtain a good induction motor, for example aluminium. For the rotor of an axial flux induction motor usually both materials are needed, and so the maximum rotation speed of the rotor is limited to that permitted by the material with the high permeability. With the measure according to the invention the circumferential rotation speed of the part of the rotor with the relatively high permeability material is made smaller than the circumferential rotation speed of the part of the rotor with the relative high electric conductivity material. Thus both materials can be loaded near to their limits, so that an axial flux motor is obtained which is capable of operating at higher circumferential rotation speeds than prior art axial induction motors.

A preferred embodiment of the axial flux induction motor is characterized in that the first outer radius $R_1$ and the second outer radius $R_2$ are chosen according to the relation:

$$1.3\ R_1 < R_2 < 1.5\ R_1.$$

It has been found that with this range a good power efficiency and a compact motor are obtained.

A simple manufacture and assembly are obtained when the first part and the second part are discs with a uniform thickness.

In a further embodiment of the invention the second part is thicker at a radius r, where $R_1 < r < R_2$. As a result of this measure the electrically conductive disk is thicker outside the location of the first part. The effective rotor resistance of such a locally thicker electrically conductive rotor disk is therefore smaller than the effective rotor resistance of an electrically conductive rotor disk of constant thickness, which constant thickness is equal to the thickness of the highly conductive disk at the location of the first part. The motor efficiency is influenced positively by the reduction of the effective rotor resistance.

In accordance with a further characteristic feature of the invention the first part is embedded wholly in the second part. This measure enables a further reduction of the effective rotor resistance to be achieved because the paths for the currents are shorter. Further embedding methods are described hereafter with reference to the drawings.

In a further embodiment of the invention the first part comprises two or more solid ring segments. This ensures that no mechanical stresses will be built up in the first part as a result of the high circumferential velocities. Since the rotor yoke is no longer self-supporting as a result of the segmentation the individual segments should be held together by the material surrounding the first part, which should also take up the centrifugal forces. In a case of the segmented first part the surrounding rotor material must handle the same centrifugal forces as in the case of preventing the break up of a solid or laminated first part, but the advantage is that the size of the segments of the first part is determined by the segmentation. Material defects in iron do not affect the safety when such construction is used.

In a further embodiment of the invention the first part comprises wound sheet or wire. In comparison with segmentation this construction has the advantage that the flux guidance in the first part is not interrupted by segment boundaries although with this construction the available volume is filled only partly with high-permeability material. With the present construction the first part can be self-supporting so that no surrounding material is required as in the case of a segmented construction. In comparison with the solid or laminated first part the wire-wound construction has the advantage that in the case of overloading each fibre will be destroyed individually while a high energy is applied, as a result of which a defective rotor of this construction is potentially less hazardous. In the case of material flaws in the high-permeability material the advantage is obtained that only the fibre with material defect is destroyed and all the other fibres remain intact. This affects neither the safety nor the performance of the motor. Advantages of this solution are the reduced eddy current losses and the very simple producibility.

In a further embodiment of the invention the first part takes the form of axially laminated sheets. In the same way as in the case of segmentation it is possible to control the size of the fragments in the event of material failure. In contradistinction to the segmented construction the first part can be self-supporting.

The vacuum cleaner according to the invention comprises a impeller wheel and an axial induction motor according the invention wherein the rotor of the axial induction motor and the impeller wheel have substantially the same outer radius. It has been found that the suction pressure that can be built up with an impeller wheel is directly dependent on the circumferential speed of the impeller wheel. To reach a satisfactory suction pressure with one impeller wheel it is necessary to increase the circumferential speed of the impeller wheel to its maximal permissible value. This can be obtained by using the axial induction motor according to the invention.

BRIEF DESCRIPTION OF THE DRAWINGS

FIGS. 1 to 8 of the drawings diagrammatically show exemplary embodiments of the invention. In the drawings FIG. 1 is a side view of an induction motor with a rotor arranged in a radial gap, FIG. 2 is a plan view showing the rotor made of two materials, FIGS. 3a, 3b to FIGS. 6a, 6b shows each time two cross-sectional views of the rotor, FIG. 7 is a plan view showing a further example of the rotor.

DESCRIPTION OF THE PREFERRED EMBODIMENTS

Figure 1:
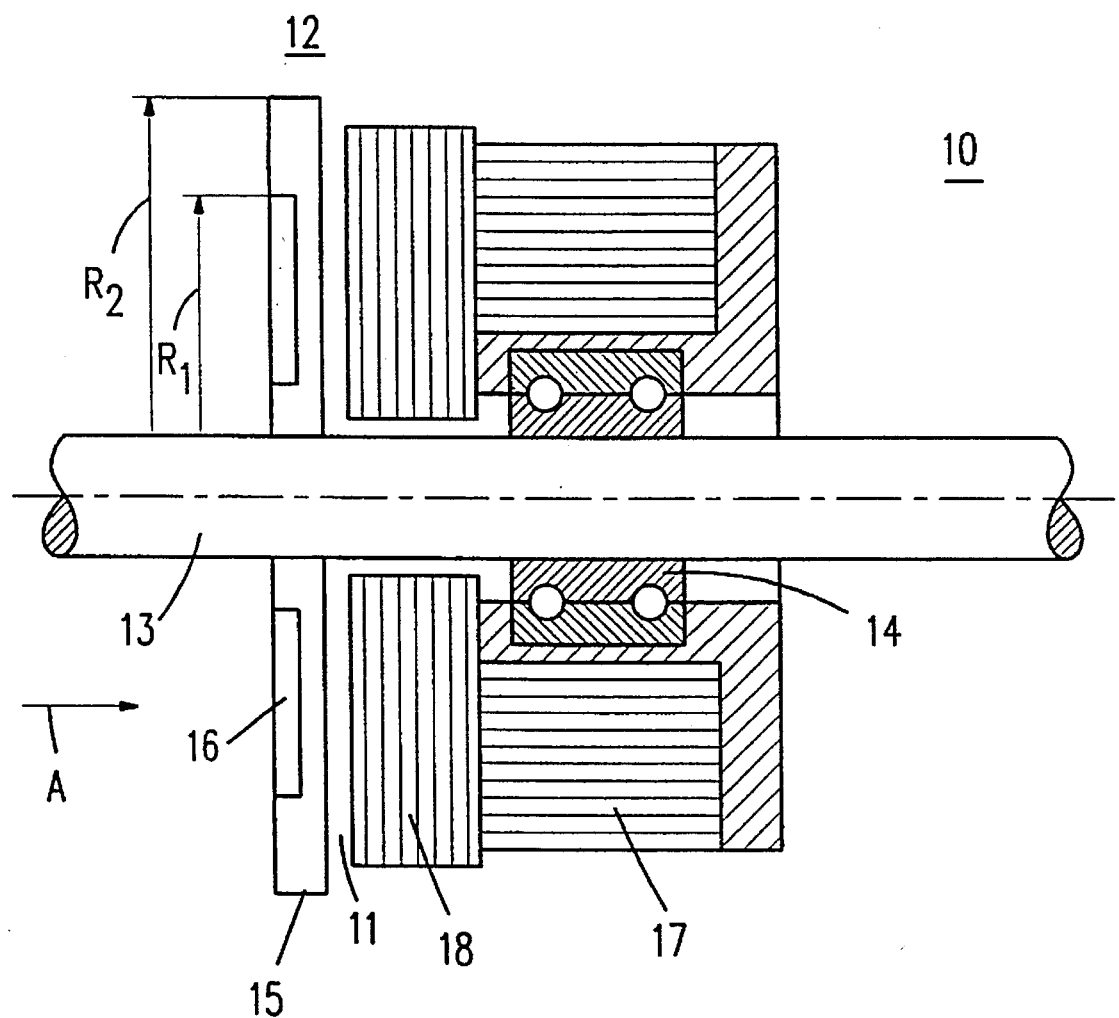

The axial-flow induction motor shown in FIG. 1 has a stator 10 and a rotor 12 displaced by a radial air gap 11, which rotor is mounted on a shaft 13 which is rotatably supported by means of a bearing 14. The rotor 12 is made up of two materials, i.e. an electrically highly conductive material 15 (aluminium) and a high permeability material 16 (iron). The high permeability material 16 has a higher specific gravity than the electrically highly conductive material 15, is given an annular ring shape, and is embedded in the rotor 12 in such a manner that only a layer of the electrically highly conductive material 15 is situated at the side facing the stator 10. The outer radius $R_1$ of the high permeability material and the outer radius $R_2$ of the electrically highly conductive material are chosen according to the relation $1.2\ R_1 < R_2 < 1.6\ R_1$, and in a particular case $R_2 \approx 1.4\ R_1$.

The various embedding methods and the form of the high permeability material 16 will be described in more detail with reference to FIGS. 4 to 6.

The stator 10 has an iron sleeve 17 formed by coiling and electric-sheet band and provided with slots for receiving a winding 18. In operation eddy currents are generated in the disc of electrically highly conductive material 15, the high permeability material 16 serving to guide the magnetic flux.

Figure 2:
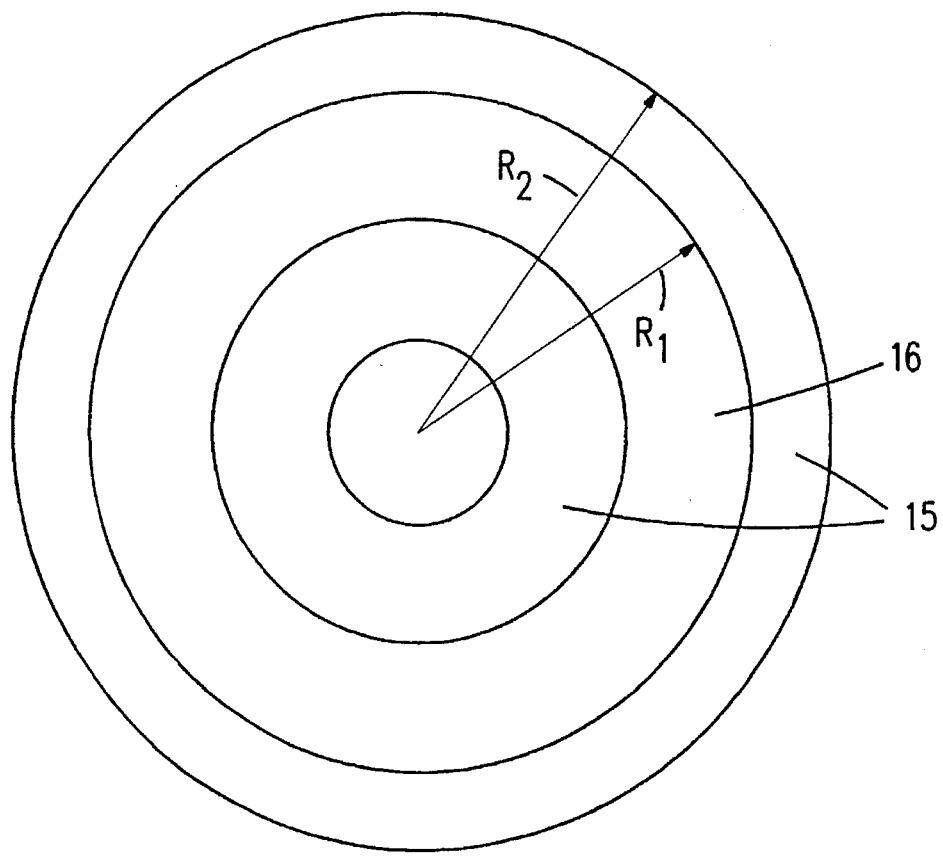
Figure 3A:
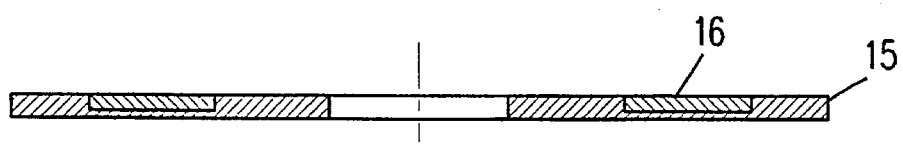
Figure 3B:
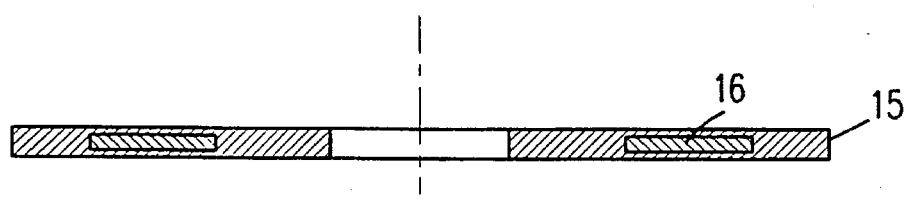

FIG. 2 is a plan view of the rotor from the direction A in FIG. 1. FIG. 3a shows the corresponding cross-sectional view. The material 16 has been embedded in the material 15 flush with the side thereof which is remote from the air gap 11. FIG. 3b shows an alternative embodiment in which the material 16 has been embedded wholly in the material 15. The material 16 in FIGS. 3a and 3b is solid iron.

Figure 4A:
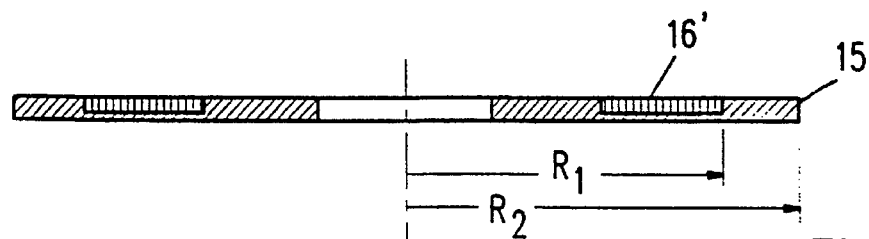
Figure 4B:
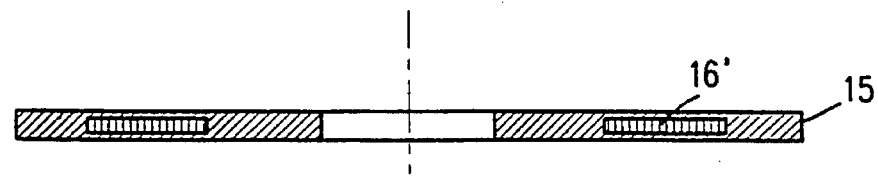
Figure 5A:
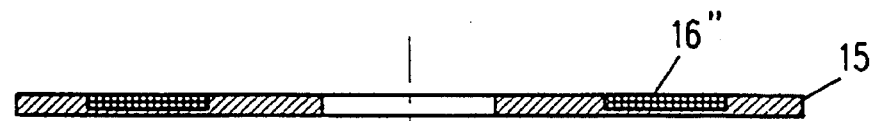
Figure 5B:
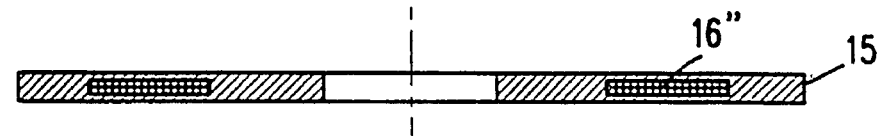
Figure 6A:
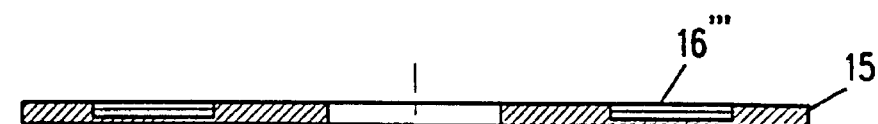
Figure 6B:
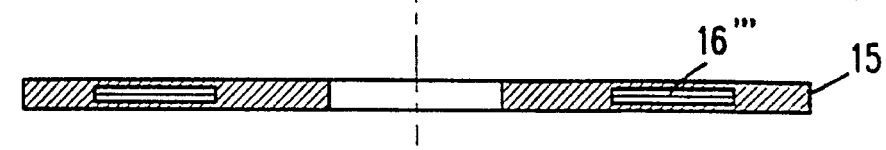

FIGS. 4a and 4b to 6 show embodiments corresponding to FIG. 3. In FIG. 4 the iron takes the form of coiled sheet band 16', in FIGS. 5a and 5b it takes the form of a wound wire 16", and in FIGS. 6a and 6b it takes the form of axially laminated sheets 16'''.

Figure 7:
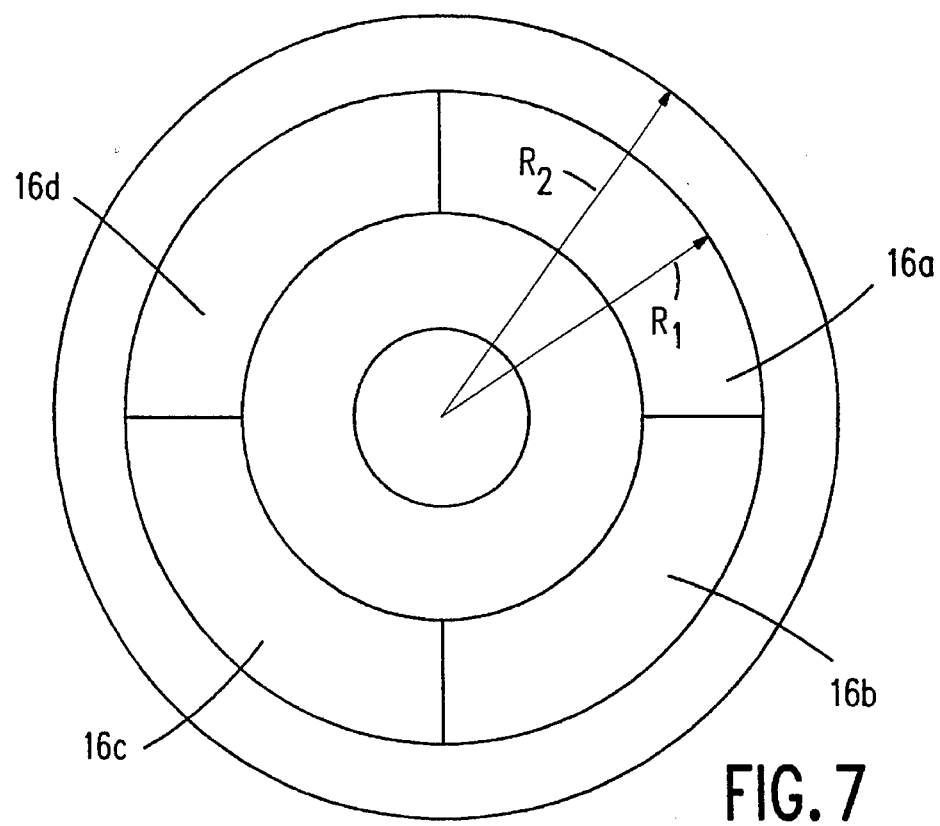
Figure 8A:
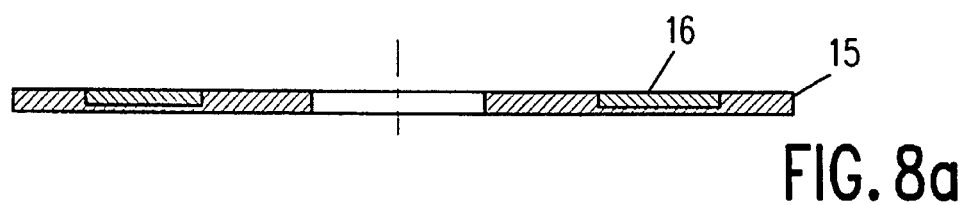
FIGS. 8a, 8b are two cross-sectional views of the rotor shown in FIG. 7.
Figure 8B:
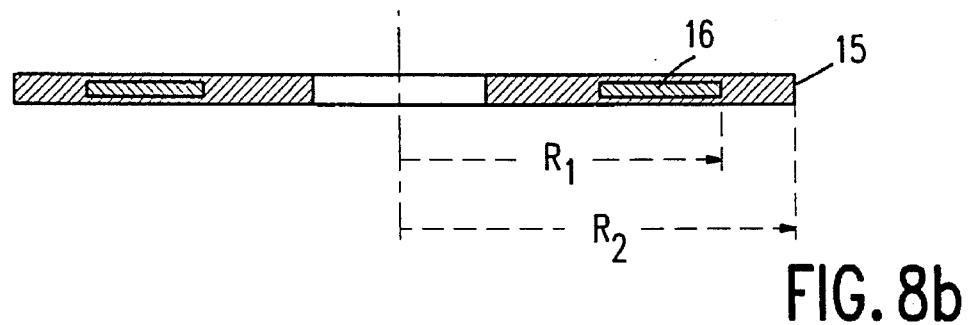

In FIG. 7 the rotor yoke, i.e. the annular ring of high permeability material 16, has been divided into four equal solid ring segments 16a to 16d. In the same way as in the other examples the segments have been embedded either wholly or partly in the electrically highly conductive material 15, as will be apparent from FIGS. 8a and 8b.

Figure 9:
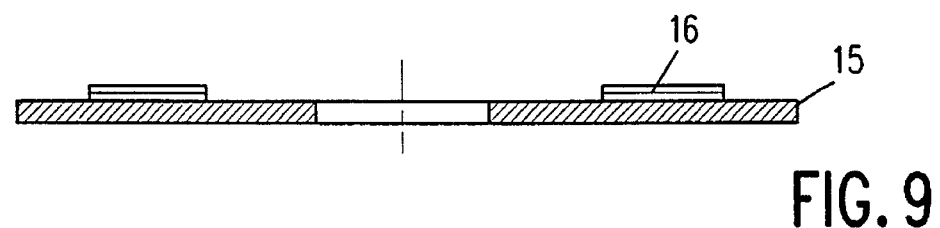
FIG. 9 is a cross-sectional views of a further rotor.

FIG. 9 is a cross-sectional view of a rotor in which the high-permeability material 16 consisting of axially laminated sheets has been mounted on the electrically highly conductive material 15.

Figure 10:
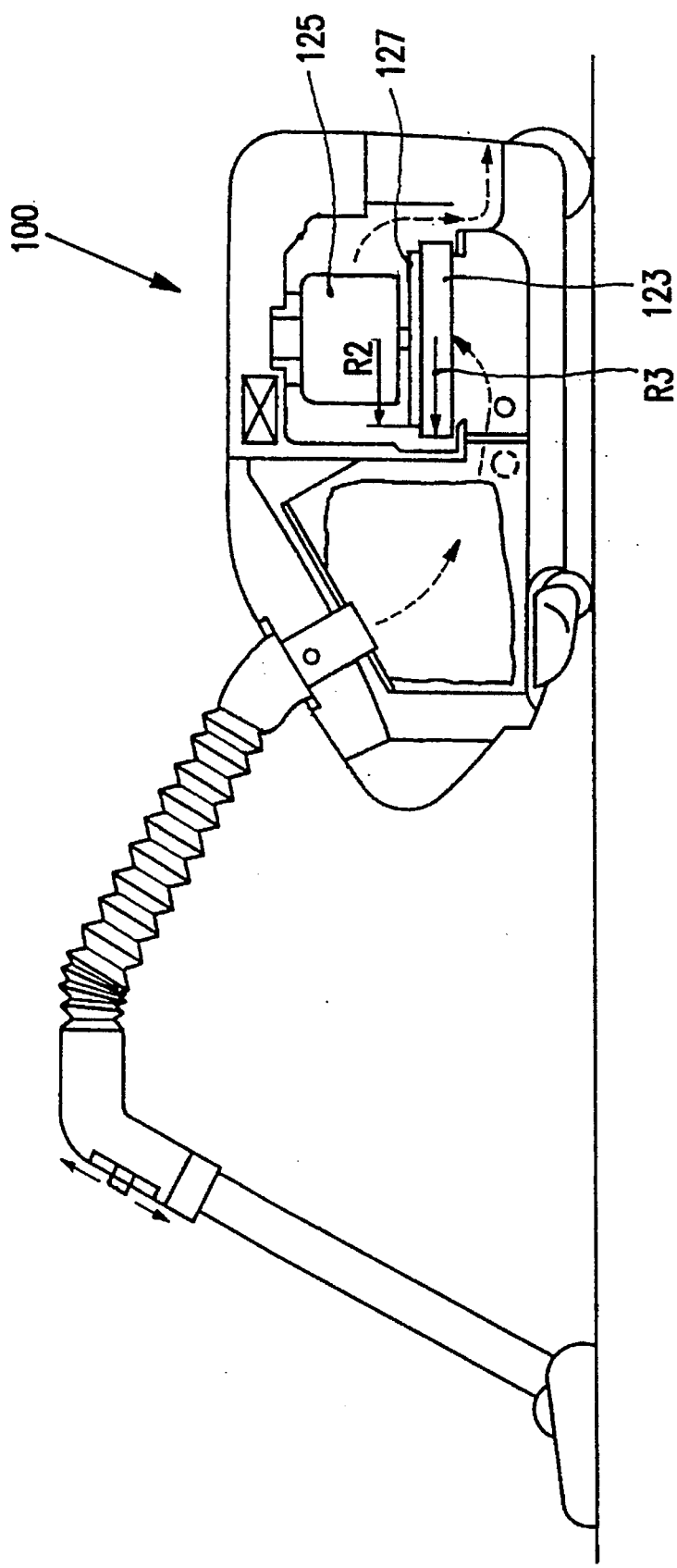
FIG. 10 shows a vacuum cleaner according to the invention.

FIG. 10 shows a vacuum cleaner 100 comprising an impeller wheel 123 and an axial induction motor 125 according to the invention. The rotor 127 of the axial induction motor 125 has an outer radius $R_2$ which is substantially equal to the outer radius $R_3$ of the impeller wheel 123. The impeller wheel may be formed as disclosed in EP 0 487 141 A2. With this vacuum cleaner 100 a satisfactory suction pressure can be built up.

We claim:

1. An axial flux induction motor comprising:

a stator having at least one magnetic pole;

a rotor constituted by a first disk-shaped part and a second disk-shaped part, the first part being either embedded in or supported on a first surface of the second part, the second part having a second surface opposite the first surface thereof, said second surface facing the stator with an air gap there-between;

said first part being of a first material and said second part being of a second material, the first material being of higher permeability and higher specific gravity than the second material, the second material being of higher electrical conductivity than the first material;

said first part having a first outer radius $R_1$ and said second part having a second outer radius $R_2$, such that $1.2\ R_1 < R_2 < 1.6\ R_1$;

whereby at high rotational speeds of the rotor the lower circumferential speed of the first part thereof results in more nearly equalized centrifugal forces on said first and second parts.

2. An axial flux induction motor according to claim 1, comprised in a vacuum cleaner having an impeller wheel which is coupled to the rotor of said motor, the rotor and the impeller wheel having substantially the same outer radius.

3. An axial flux induction motor according to claim 1 characterized in that, the first outer radius $R_1$ and the second outer radius $R_2$ are chosen according to the relation:

$1.3\ R_1 < R_2 < 1.5\ R_1$.

4. An axial flux induction motor according to claim 1, characterized in that the first part is mounted on the first surface of the second part and both said parts are disks with a uniform thickness.

5. An axial flux induction motor according to claim 1, characterized in that the first part is imbedded in the first surface of the second part and the second part is thicker at a radius $r > R_1$.

6. An induction motor as claimed in claim 5, characterised in that the first part is embedded wholly in the second part.

7. An induction motor as claimed in claim 1, characterised in that the first part comprises two or more solid ring segments.

8. An induction motor as claimed in claim 1, characterised in that the first part comprises axially laminated sheets.

* * * * *